US011813826B2

(12) United States Patent
Bluemel et al.

(10) Patent No.: US 11,813,826 B2
(45) Date of Patent: Nov. 14, 2023

(54) ANTISTATIC STRETCH FILM

(71) Applicant: BASF SE, Ludwigshafen am Rhein (DE)

(72) Inventors: Marcus Harald Bluemel, Lemfoerde (DE); Hilar Altenhofer, Ludwigshafen (DE); Frank Schaefer, Lemfoerde (DE); Johannes Fischer, Ludwigshafen (DE); Anja Oltmanns, Lemfoerde (DE); Torsten Neises, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/996,320

(22) PCT Filed: Apr. 8, 2021

(86) PCT No.: PCT/EP2021/059230
§ 371 (c)(1),
(2) Date: Oct. 14, 2022

(87) PCT Pub. No.: WO2021/209319
PCT Pub. Date: Oct. 21, 2021

(65) Prior Publication Data
US 2023/0131631 A1 Apr. 27, 2023

(30) Foreign Application Priority Data
Apr. 16, 2020 (EP) .................... 20169914

(51) Int. Cl.
*B32B 27/08* (2006.01)
*B32B 7/12* (2006.01)
*B32B 25/08* (2006.01)
*B32B 25/14* (2006.01)
*B32B 27/18* (2006.01)
*B32B 27/30* (2006.01)
*B32B 27/32* (2006.01)
*B32B 27/40* (2006.01)

(52) U.S. Cl.
CPC ............... *B32B 27/08* (2013.01); *B32B 7/12* (2013.01); *B32B 25/08* (2013.01); *B32B 25/14* (2013.01); *B32B 27/18* (2013.01); *B32B 27/30* (2013.01); *B32B 27/302* (2013.01); *B32B 27/304* (2013.01); *B32B 27/306* (2013.01); *B32B 27/32* (2013.01); *B32B 27/40* (2013.01); *B32B 2250/242* (2013.01); *B32B 2270/00* (2013.01); *B32B 2274/00* (2013.01); *B32B 2307/21* (2013.01); *B32B 2307/51* (2013.01)

(58) Field of Classification Search
CPC . B32B 27/40; B32B 2375/00; B32B 2323/04; B32B 7/10
See application file for complete search history.

(56) References Cited

U.S. PATENT DOCUMENTS

| 5,965,206 | A | 10/1999 | Hilti et al. |
| 8,715,799 | B2 | 5/2014 | Prissok et al. |
| 2004/0043171 | A1* | 3/2004 | Audett ............... A61K 9/0014 |
| | | | 428/35.7 |
| 2016/0260516 | A1 | 9/2016 | Schaefer et al. |

FOREIGN PATENT DOCUMENTS

| EP | 0829520 B1 | 10/2004 |
| EP | 2170972 A1 | 1/2009 |
| EP | 2058009 A1 | 5/2009 |
| JP | 2007320093 | 12/2007 |
| WO | WO-2009/010502 A1 | 1/2009 |
| WO | 2009/086246 | 7/2009 |
| WO | WO-2011/069960 A1 | 6/2011 |

OTHER PUBLICATIONS

European Search Report for EP Patent Application No. 20169914.7, dated Aug. 26, 2020, 3 pages.
Zweifel, et al., Plastics additives handbook, 5th Edition, Hanser Gardner Publications, 2001, pp. 98-136.
International Search Report dated Jun. 23, 2021, in PCT/EP2021/059230, 3 pages.
International Preliminary Report on Patentabiiity dated Jul. 15, 2022, in PCT/EP2021/059230, 6 pages.
Written Opinion dated Jun. 23, 2021, in PCT/EP2021/059230, 6 pages.

\* cited by examiner

*Primary Examiner* — Gregory Listvoyb
(74) *Attorney, Agent, or Firm* — Grüneberg and Myers PLLC

(57) ABSTRACT

A stretchable antistatic film can be formed in a production process using a specific thermoplastic polyurethane. The thermoplastic polyurethane is useful for the production of said film.

15 Claims, No Drawings

ANTISTATIC STRETCH FILM

CROSS-REFERENCE TO RELATED APPLICATIONS

This application is the National Stage entry under § 371 of International Application No. PCT/EP2021/059230, filed on Apr. 8, 2021, and which claims the benefit of priority to European Application No. 20169914.7, filed on Apr. 16, 2020. The content of each of these applications is hereby incorporated by reference in its entirety.

BACKGROUND OF THE INVENTION

Field of the Invention

This invention is directed to an antistatic film.

Description of Related Art

Antistatic films are known and described e.g. in EP 0 829 520, EP 2 170 972, WO 2009/086249 and EP 2 058 009 as well as antistatic additives to polymers as outlined e.g. in US 2016/0260516 A1. Whereas the disadvantage of antistatic films in the market is that the films do not fulfill mechanical requirements for stretching, or if the film is a stretch film, the electrical resistance is too high for a wide range of applications. In other words, there is a long unmet desire in the market for the development of films preferably stretch films with sufficient mechanical performance and at the same time good antistatic property.

SUMMARY OF THE INVENTION

Surprisingly this problem could be solved by the film according to the features as described below. Another aspect of this invention is the use of a thermoplastic polyurethane for a film as described below, and yet another aspect is the process producing this film.

In a first embodiment the invention is directed to a film, preferably a stretchable film, comprising at least two layers, layer A and layer B, each layer having an inner surface being in contact with the respective other layer, and an outer surface being opposite the inner surface, wherein
  layer A comprises a polymer 1 composition
  layer B comprises a thermoplastic polyurethane composition (TPU composition), and optionally a polymer 2 composition,
    the polyurethane of the TPU composition is prepared from
      an organic diisocyanate
      a polyol comprising a diol A and a diol B, wherein the diol A comprises ethoxy and propoxy groups and the diol B comprises butoxy groups.
      a chain extender
and the TPU composition comprises a salt or an ionic liquid or is a mixture of a salt and an ionic liquid.

Advantage of the film according to this invention inter alia are good mechanical properties of the film. The film may even be a stretchable film, may be transparent and may bear big loads. Due to the inventive layer structure, the electrical resistance is only less effected, even when the film is stretched. In addition, the layer structure of the film with the salt or ionic liquid in the TPU composition show less migration of these antistatic additives, e.g. in the adhesive layer or from a layer B to the layer A as compared to other antistatic additives used so far.

DETAILED DESCRIPTION OF THE INVENTION

Preferably the layer A is a film. Polymer compositions as used in layer A themselves frequently have insufficient conductivity, even if conductivity enhancing additives are added. As a result, the film becomes electrostatically charged and sparking may occur. The conductivity of layer A whereas enormously is enhanced with the thermoplastic polyurethane composition (TPU composition) of layer B. Therefore, layer B preferably covers one whole surface of layer A.

The TPU composition preferably is a film or a net structure. This structure is preferably directly on the inner surface of layer A.

The term 'composition' indicates, that the composition does not comprise the respective polymer only, but may comprise other polymers additives, auxiliaries or mixtures thereof.

In a preferred embodiment according to the precedent embodiment or one of its preferred embodiments, the layer B comprises a thermoplastic polyurethane composition and a polymer 2 composition. The TPU composition is preferably embedded in polymer 2 in form of a net structure. This net structure preferably is established by thoroughly mixing the TPU composition with the polymer 2 composition. The net structure of the TPU composition in the polymer 2 composition therefore is irregular.

Polymer 2 preferably is a non-polar polymer. Preferably polymer 2 is selected to enhance the adhesion or compatibility, or both of them, of layer B and layer A.

In preferred embodiment the respective compositions comprise auxiliaries or additives, or mixtures thereof. Preferred auxiliaries by way of example are catalysts, surface-active substances, flame retardants, nucleating agents, lubricant wax, dyes, pigments, or stabilizers, or are mixtures thereof. Stabilizers are additives which protect a polymer against damaging environmental influences, preferably e.g. against oxidation, hydrolysis, light, heat, or discoloration. Preferred additives by way of example are inorganic or organic fillers and reinforcing materials, or mixtures thereof.

It is important that layer B completely covers the inner surface of layer A. Therefor in one preferred embodiment layer B is a film. In another preferred embodiment layer B has a net structure. The net structure is regular or irregular. Preferably the irregular net structure derives from a melt spun process or is se result of a stretching process.

In another embodiment comprising all the features of the precedent embodiment or its preferred embodiments, the film has an elongation at break of more than 50%, preferably more than 100%, more preferably more than 150%, more preferably more than 200%, more preferably more than 250%, most preferably more than 300%, measured according to DIN ISO 53504, 2017-03. The maximum elongation of these embodiments when stretched is not more than 500%, 450%, 400%, 350%, 320%, 300%, 250%, 200%, 150%, 100% or 50%.

In other words, the film with these properties is stretchable, is a stretch film or is a stretchable film.

Preferably polymer 1 and, if applicable, polymer 2 is independently selected from the group consisting of, polystyrene (PS), polyoxymethylene (POM), ethylene-vinyl acetate (EVA), acrylonitrile-butadiene-styrene (ABS), thermoplastic polyurethane (TPU), polyvinylchloride (PVC), polyethylene (PE) and polypropylene (PP), or is a mixture thereof.

More preferably polymer 1, and if applicable, polymer 2 is independently selected from the group consisting of soft polyvinyl chloride (sPVC), thermoplastic polyurethane (TPU), polyethylene (PE), low-density polyethylene (LDPE) or linear low-density polyethylene (LLDPE), or is a mixture thereof.

More preferably polymer 1 and if applicable polymer 2 is independently selected from the group consisting of thermoplastic polyurethane (TPU), polyvinylchloride (PVC), polyethylene (PE) and polypropylene (PP), or is a mixture thereof.

In another preferred embodiment polymer 1 and, if applicable, polymer 2 is independently selected from the group consisting of soft polyvinylchloride (PVC) and polyethylene (PE), or is a mixture thereof.

A soft polyvinyl chloride (sPVC) is a polyvinyl chloride (PVC) to which a plasticizer is added. The plasticizer preferably is added in an amount of more than 10 weight % referring to the total amount of the weight of the polyvinyl chloride, more preferably more than 20 weight %, more preferably more than 30 weight %, more than 40 weight % and at the same time less than 70 weight %, preferably less than 60 weight % and more preferably less than 55 weight %. Preferred of these plasticicers in the polyvinyl chloride (PVC) are selected from the group consisting of phthalic acid ester, acetyltributyl citrate (TBAC), chlorinated paraffin, adipic acid ester, and phosphoric acid esters, or are mixtures thereof.

The polyethylene (PE) in a preferred embodiments of the embodiments outlined above, is a low-density polyethylene (LDPE) or a linear low-density polyethylene (LLDPE). Preferably the polyethylene (PE) of the polymer 1 is a mixture of low-density polyethylene (LDPE) and linear low-density polyethylene (LLDPE), and, if required, polymer 2 is low-density polyethylene (LDPE).

If the polymer 2 composition comprises a thermoplastic polyurethane, in a preferred embodiment the recipe of this thermoplastic polyurethane differs from that of the thermoplastic polyurethane composition into which the salt, the ionic liquid, or salt and the ionic liquid are incorporated.

In another preferred embodiment the polymer 1 and, if applicable, polymer 2 is independently selected from the group consisting of polyethylene (PE) and polypropylene (PP), or is a mixture thereof. Preferably polymer 1 and, if applicable, polymer 2, is polyethylene (PE). In a preferred embodiment in layer A and layer B no other polymer beside polyethylene (PE) composition and the TPU composition is comprised in the film.

More preferred polymer 1 and, if required, polymer 2 in one of the above outlined embodiments is a low-density polyethylene (LDPE) or a linear low-density polyethylene (LLDPE). Preferably polymer 1 is a mixture of low-density polyethylene (LDPE) and linear low-density polyethylene (LLDPE), and, if required, polymer 2 is low-density polyethylene (LDPE).

LDPE:

Preferably, the low-density polyethylene (LDPE) has a density between 0.90 g/cm$^3$ and 0.95 g/cm$^3$, more preferably between 0.91 g/cm$^3$ and 0.93 g/cm$^3$, most preferably 0.92 g/cm$^3$, measured according to DIN EN ISO 1183-1:2019, A.

Preferably the melt flow index (MFI, also referred to as melt flow rate MFR) of the low-density polyethylene (LDPE) is between 0.5 g/10 min and 2.0 g/10 min at 190° C. and 2.16 kg load, measured according to DIN EN ISO 1133-1:2011, more preferably between 0.8 g/10 min and 1.5 g/10 min, even more preferably between 0.9 g/10 min and 1.1 g/10 min, most preferably 1.0 g/10 min.

Preferably the Vicat temperature of the low-density polyethylene (LDPE) is between 90° C. and 100° C., measured according to DIN EN ISO 306:2013, A, more preferably between 92° C. and 99° C., more preferably between 94° C. and 98° C., more preferably between 95° C. and 97° C., most preferably 96° C.

LLDPE:

Preferably the linear low-density polyethylene (LLDPE) has a density between 0.90 g/cm$^3$ and 0.95 g/cm$^3$, more preferably between 0.91 g/cm$^3$ and 0.93 g/cm$^3$, most preferably 0.92 g/cm$^3$, measured according to DIN EN ISO 1183-1:2019, A.

Preferably the melt flow index (MFI) of the linear low-density polyethylene (LLDPE) is between 0.5 g/10 min and 2.0 g/10 min at 190° C. and 2.16 kg load, measured according to DIN EN ISO 1133-1:2011, more preferably between 0.8 g/10 min and 1.5 g/10 min, even more preferably between 0.9 g/10 min and 1.1 g/10 min, most preferably 1.0 g/10 min.

Preferably the Vicat temperature of the linear low-density polyethylene (LLDPE) is between 97° C. and 107° C., measured according to DIN EN ISO 306:2013, A, more preferably between 99° C. and 105° C., more preferably between 100° C. and 104° C., more preferably between 101° C. and 103° C., most preferably 102° C.

The preferred embodiments of LDPE, respectively LLDPE these parameters of density, melt flow index, and Vicat temperature are either single preferred parameters, in other preferred embodiments two of these preferred parameters appear together or three of these preferred parameters appear together in preferred LDPE, respectively LLDPE.

In preferred embodiments the film has a thickness between 1 μm and 1 cm, preferably between 0.001 mm and 1 mm, even more preferred between 0.01 μm and 0.5 mm, more preferred between 0.01 mm and 0.05 mm. In a preferred embodiment the film is about 0.02 mm. In a preferred embodiment the main part of the film is layer A. Layer B and, if applicable, layer C preferably and independently from each other have a thickness of 0.001 mm to 0.5 mm, preferably between 0.001 and 0.05 mm, more preferred between 0.001 mm and 0.01 mm.

Thermoplastic Polyurethane Composition

The thermoplastic polyurethane composition prepared from diol A and diol B of the precedent embodiment is further described in US 2016/0260516, herein incorporated by reference.

The thermoplastic polyurethane composition of the embodiments as outlined above, respectively their preferred embodiments, comprises a thermoplastic polyurethane, where the thermoplastic polyurethane is prepared from a) a diisocyanate,
b) a polyol comprising a diol A and a diol B and
c) a chain extender, optionally with the aid of a catalysts and optionally further comprising an additive, an auxiliary, or both of them, wherein a salt and/or an ionic liquid, preferably an ionic liquid, is comprised in the composition and the diol A comprises ethoxy and propoxy groups and the diol B comprises butoxy groups.

Thermoplastic polyurethanes per se are adequately known. They are prepared by reacting (a) isocyanates with (b) compounds which are reactive toward isocyanates, also referred to as polyols, and have a number average molecular weight of from $0.5 \times 10^3$ g/mol to $300 \times 10^3$ g/mol, and optionally chain extenders having a molecular weight of $0.05\times10^3$ g/mol to $0.499\times10^3$ g/mol, optionally with the aid of catalysts and/or additives and/or auxiliaries.

The components (a) isocyanate, (b) compound which are reactive toward isocyanates and (c) chain extender are also referred to individually or collectively as building components.

The diisocyanate preferably is an organic isocyanate. Further preferred the isocyanate is selected from the group of aliphatic, cycloaliphatic, araliphatic and aromatic isocyanates, or is a mixture thereof. The isocyanate preferably is selected from the group consisting of tri-, tetra-, penta-, hexa-, hepta- and/or octamethylene diisocyanate, 2-methyl-pentamethylene 1,5-diisocyanate, 2-ethyl-butylene-1,4-diisocyanate, 1,5-pentamethylene diisocyanate (PDI), 1,4-butylenediisocyanate, 1-isocyanato-3,3,5-trimethyl-5-isocyanatomethyl-cyclohexane (isophorone diisocyanate, IPDI), 1,4-bis(isocyanatomethyl)cyclohexane and/or 1,3-bis(isocyanatomethyl)cyclohexane (HXDI), 2,4-paraphenylene diisocyanate (PPDI), 2,4-tetramethylene xylene diisocyanate (TMXDI), 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 1,5-naphthylene diisocyanate (NDI), 2,4- and/or 2,6-toluene diisocyanate (TDI), 3,3'-dimethyl-diphenyl diisocyanate, 1,2-diphenylethane diisocyanate and/or phenylene diisocyanate, or is a mixture thereof.

Further preferred the isocyanate is an aliphatic diisocyanate, more preferably selected from the group consisting of 4,4'-, 2,4'- and 2,2'-dicyclohexylmethane diisocyanate (H12 MDI), 1-isocyanato-3,3,5-trimethyl-5-isocyanatomethyl-cyclohexane (isophorone diisocyanate, IPDI), 1,6-hexamethylene diisocyanate (HDI) 1,4-cyclohexane diisocyanate, 1-methyl-2,4- and/or -2,6-cyclohexane diisocyanate, 1,4-bis(isocyanatomethyl)cyclohexane and/or 1,3-bis(isocyanatomethyl)cyclohexane (HXDI), tri-, tetra-, penta-, hexa-, hepta- and/or octamethylene diisocyanate, 2-methyl-pentamethylene 1,5-diisocyanate, 2-ethyl-butylene-1,4-diisocyanate, 1,5-pentamethylene diisocyanate (PDI), 1,4-butylene-diisocyanate, or is a mixture thereof.

A very preferred isocyanate is 1,6-hexamethylene diisocyanate (HDI).

As compound (b) which is reactive toward isocyanates, preference is given to using polyesterols or polyetherols, which are also summarized under the term "polyols". Polyetherols are preferred. The number average molecular weights of these polyols are in the range from $0.5\times10^3$ kg/mol to $8\times10^3$ kg/mol, preferably from $0.6\times10^3$ g/mol to $5\times10^3$ g/mol, in particular from $0.8\times10^3$ g/mol to $3\times10^3$ kg/mol. The polyols preferably have an average functionality in the range from 1.8 to 2.4, preferably from 1.9 to 2.2, in particular 1.95 to 2.05. The polyols (b) preferably have only primary hydroxyl groups. Preferred polyols are diols.

According to the invention, the polyol comprises at least two diols, diol A and diol B, with diol A comprising ethoxy groups and propoxy groups and diol B comprising butoxy groups.

In a preferred embodiment, the molar percentage of the ethoxy and propoxy groups and butoxy groups in the TPU composition is in each case at least 5 mol %, preferably at least 10 mol %, based on the mole weight of the total polyol. Further preference is given to the proportion of ethoxy groups in the polyol in the TPU composition at the same time being at least 25 mol %, more preferably at least 40 mol %, more preferably at least 60 mol % and particularly preferably at least 65 mol %, based on the total polyol.

Very particular preference is given to the molar percentage of the ethoxy group being in the range from 70 mol % to 75 mol %, the proportion of the propoxy group being in the range from 12 mol % to 18 mol % and the proportion of the butoxy groups being in the range from 12 mol % to 18 mol %, based on the total polyol.

The determination of the molar percentage is carried out by means of 1H NMR in accordance with ASTM D4875-11 (2011) Standard Test Methods of Polyurethane Raw Materials: Determination of the Polymerized Ethylene Oxide Content of Polyether Polyols.

Further preference is given to the diol B in the TPU composition being a homopolymer of butoxy groups. A homopolymer is a polymer which is made up of virtually only one monomer group, i.e. essentially does not comprise any other monomers. "Essentially" means that at least 95 mol % of the homopolymer consists of butoxy groups, more preferably at least 97.5 mol % and particularly preferably at least 99 mol %. Preferably the molecular weight of the diol B is between 500 g/mol and $2.0\times10^3$ g/mol. In other preferred embodiment the number average molecular weight of diol B is $0.6\times10^3$ g/mol, $0.7\times10^3$ g/mol, $0.8\times10^3$ g/mol, $0.9\times10^3$ g/mol, $1.0\times10^3$ g/mol, $1.1\times10^3$ g/mol, $1.1\times10^3$ g/mol, $1.2\times10^3$ g/mol, $1.3\times10^3$ g/mol, $1.4\times10^3$ g/mol, $1.5\times10^3$ g/mol, $1.6\times10^3$ g/mol, $1.7\times10^3$ g/mol, $1.8\times10^3$ g/mol, $1.9\times10^3$ g/mol, or $2.0\times10^3$ g/mol.

In another preferred embodiment the film according to any of the precedent embodiments or one of their preferred embodiments the diol A is a block copolymer having a block and two ends, and the block comprises ethoxy and propoxy groups and the two ends of the block copolymer comprise exclusively ethoxy groups.

In this block polymer, the proportion of ethoxy groups in the two ends of the block copolymer is preferably more than 5 mol %, preferably at least 10 mol % and particularly preferably at least 15 mol %, based on the number average molecular weight of the total block copolymer. The ends of the block copolymer very particularly preferably comprise from 10 mol % to 20 mol % of the ethoxy groups, based on the total block copolymer, and the block of the block copolymer comprises in the range from 60 mol % and 70 mol % of ethoxy groups and in addition from 15 mol % to 20 mol % of propoxy groups, based on the total block copolymer.

Polyol A is prepared by adding the desired cyclic alkylene oxides, in the present case ethylene oxide and propylene oxide, to a bifunctional starter molecule in a reactor in a 1st step, so that the cyclic alkylene oxides polymerize with ring opening to form a prepolymer. Preference is given to using starter molecules having two OH groups, which are preferably primary OH groups. Very particularly preferred examples are 1,2-ethylene glycol, also referred to as monoethyl glycol (MEG), diethylene glycol (DEG), monopropanediol (MPG), preferably 1,3-propylene glycol, and also dipropanediol (DPG), preferably 4-oxa-1,7-heptanediol. The structure of the prepolymer can be determined by the addition of the alkylene oxides. If ethylene oxide and then propylene oxide are added alternately, blocks of these monomers are formed in the prepolymer as a function of the amounts added; this is also referred to as the block mode of operation. If both alkylene oxides are added simultaneously, the alkylene oxides react arbitrarily, which is also referred to as the mixed mode of operation. The mixed mode of operation is preferred. A person skilled in the art can control the structure of the polyol and the molar distribution of the monomers within a narrow range on the basis of the molecular weights of the alkylene oxides and control of the amounts added. In a preferred embodiment, exclusively ethylene oxide is added in a step 2 to the prepolymer from step 1, so that the diol A has ethoxy groups at the ends. The diol A in preferred embodiments has a number average molecular weight between $1.5 \times 10^3$ g/mol and $3.0 \times 10^3$ g/mol. In other preferred embodiments the diol A has a number average molecular weight of $1.6 \times 10^3$ g/mol, $1.8 \times 10^3$ g/mol, $2.0 \times 10^3$ g/mol, $2.2 \times 10^3$ g/mol, $2.4 \times 10^3$ g/mol $2.6 \times 10^3$ g/mol, or $2.8 \times 10^3$ g/mol.

The ring-opening polymerization is carried out with the aid of catalysts. Here, preference is given to basic catalysts such as alkali metal or alkaline earth metal hydroxides or alkali metal or alkaline earth metal alkoxides, preferably NaOH, KOH, CsOH or sodium methoxide and potassium methoxide. Other preferred catalysts are ones which comprise functional amino groups; preferred examples are N,N-dimethylethanolamine (DMEOA) or imidazole. A third group of preferred catalysts is carbenes, preferably N-heterocyclic carbenes.

The product obtained in step 2 is precipitated by means of a precipitant in step 3. Precipitants are usually proton donors; examples of preferred precipitants are carbonic acid ($H_2CO_3$), phosphoric acid ($H_3PO_4$). The polymer worked up in step 3 is filtered in a 4th step in order to remove the catalyst. Binders are used as filtration aids; preferred examples of binders are cellulose or silica gel. Polyol B is prepared analogously, with exclusively butylene oxide being used in step 1 and step 2 being omitted.

A preferred polyol A is the polyol which can be procured under the name Lupranol VP9243 from BASF Polyurethanes GmbH in October 2013.

Chain Extenders

In preferred embodiments comprising all features of the precedent embodiments or their preferred embodiments, a chain extender is comprised in the thermoplastic polyurethane of the TPU composition, which preferably is aliphatic, araliphatic, aromatic or cycloaliphatic. The molecular weight preferably is of from $0.05 \times 10^3$ kg/mol to $0.499 \times 10^3$ kg/mol. The chain extender preferably is a 2-functional compound, i.e. it has two groups which are reactive toward isocyanate. Preferably the chain extender is a diamine or an alkane diol having from 2 to 10 carbon atoms in the alkylene radical or is a mixture thereof.

In a preferred embodiment the chain extender is selected from the group consisting of 1,2-ethylene glycol, 1,2-propanediol, 1,3-propanediol, 1,4-butanediol, 2,3-butanediol, 1,5-pentanediol, 1,6-hexanediol, diethylene glycol, dipropylene glycol, di-, tri-, tetra-, penta-, hexa-, hepta-, okta-, nona- and/or deca alkylene glycole, of the alkylenes as mentioned before, 1,4-cyclohexanediol, 1,4-dimethanol cyclohexane, neopentylglycol and hydroquinone bis (beta-hydroxyethyl) ether (HQEE), or is a mixture thereof.

Preferably the chain extender selected from the group consisting of 1,3-propanediol, 1,4-butanediol, and 1,6-hexanediol, or is a mixture thereof.

1,6-Hexanediol is very particularly preferably used as chain extender.

Ionic Liquid or Salt

In a preferred embodiment, a salt a ionic liquid, or a mixture thereof is comprised in the TPU composition in an amount of from 0.1% by weight to 25% by weight, preferably from 1% by weight to 10% by weight, more preferably from 1.5% by weight to 7.5% by weight and particularly preferably from 2% by weight to 5% by weight, in the thermoplastic polyurethane composition. The % by weight is based on the total amount of the thermoplastic polyurethane composition into which the salt and/or the ionic liquid is incorporated.

In principle, any salt or any ionic liquid is suitable for being incorporated into the thermoplastic polyurethane composition, in one preferred embodiment salt is preferred in yet another preferred embodiment ionic liquid is preferred.

Ionic Liquids

Suitable ionic liquids may be found in WO 2011/069960. This document is incorporated by reference into the present patent application.

The ionic liquid is either a single substance or a mixture of various substances.

The ionic liquid is preferably liquid at a temperature above 210° C., preferably above 200° C., and particularly preferably above 190° C.

A preferred group of ionic liquids is an ionic liquid comprising an imidazole ring. Particular preference is given to the 1-butyl-3-methylimidazolium ion (BMIM) or the 1-ethyl-3-methylimidazolium ion (EMIM).

Another group of preferred ionic liquids comprise a diazabicyclo structure, with particular preference being given to the monoprotonated form of 1,8-diazabicyclo [5.4.undec-7-ene (DBU) or of 1,5-diazabicyclo[4.3.non-5-ene.

Salt

Preferred salts which are used in the thermoplastic polyurethane composition are salts of an inorganic or low molecular weight organic protic acid. Low molecular weight means that the molecular weight of the protic acid is less than $0.5 \times 10^3$ kg/mol, preferably less than $0.4 \times 10^3$ g/mol and particularly preferably less than $0.3 \times 10^3$ g/mol.

The salt is preferably selected from the group consisting of alkaline earth metal salt, perchlorate or quaternary ammonium salt, or is a mixture thereof. Preferably the salt is selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4$, $F_9SO_3$, $Ca(ClO_4)$, $Ca(PF_6)$, $Mg(ClO_4)$, $Mg(CF_3SO_3)$, $Zn(ClO_4)$, $Zn(PF_6)$, $Ca(CF_3SO_3)$, quaternary ammonium ethosulfate, mixtures of fatty acid-polyol esters and sodium perchlorate, partial fatty acid esters, alkali metal salts of quaternary ammonium compounds in combination with sodium dicyanamide, Na salt of dodecylbenzene sulfonic acid and 1-hydroxytallow-1-trimethylammonium chloride, or is a mixture thereof. Preference is given to the salts selected from the group consisting of $LiClO_4$, $LiCF_3SO_3$, $NaClO_4$, $LiBF_4$, or a mixture thereof, with very particular preference being given to $LiCF_3SO_3$.

A salt is, in a preferred embodiment, used alone in the thermoplastic polyurethane composition. In other preferred embodiments, at least two salts are used. In further preferred embodiments, at least one salt and an ionic liquid are comprised in the thermoplastic polyurethane composition.

The polymer 2 is particularly preferably selected from the group consisting of polyethylene, polypropylene and polystyrene. Preferably polymer 2 is polyethylene, more preferably is low-density polyethylene (LDPE), even more preferably a linear low-density polyethylene (LLDPE).

Preferably the thermoplastic polyurethane of the TPU composition is present in the film in an amount of between 0.01 weight % and 10 weight %, preferably between 0.1 weight % and 5 weight %, more preferably between 0.5 weight % and 3 weight %, even more preferably between 0.5 weight % and 3 weight %, referring to the total weight of the film, Catalysts Catalysts (d) which, in particular, accelerate the reaction between the NCO groups of the diisocyanates (a) and the hydroxyl groups of the compound, which is reactive toward isocyanates, also referred to as polyol, and the chain extenders (c), in a preferred embodiment are tertiary amines, in particular triethylamine, dimethylcyclohexylamine, N-methylmorpholine, N,N'-dimethyl-piperazine, 2-(dimethylaminoethoxy)ethanol, diazabicyclo[2.2.octane]; In other preferred embodiment the catalyst is an organic metal compound, preferably selected from the group consisting of titanic ester, iron compound, tin compound, or bismuth salt. A preferred iron compound is iron(III) acetylacetonate. Preferred tin compounds are tin diacetate, tin dioctoate, tin dilaurate or the dialkyltin salts of aliphatic carboxylic acids, preferably tin dioctoate, tetrabutyl orthotitanate. In preferred bismuth salts, the bismuth is present in the oxidation states 2 or 3, in particular 3, with preference being given to salts of carboxylic acids, preferably carboxylic acids having from 6 to 14 carbon atoms, particularly preferably from 8 to 12 carbon atoms. A very preferred bismuth salt is bismuth(III) neodecanoate, bismuth 2-ethylhexanoate, or bismuth octanoate, or is a mixture thereof.

Preference is given to using tin catalysts, in particular tin dioctoate.

The catalysts (d) is preferably used in an amount of from 0.0001 to 0.1 part by weight per 100 parts by weight of the compound reactive toward isocyanates, also referred to as polyol, and the chain extender.

Auxiliaries/Additives

Apart from catalysts, auxiliaries and/or additives can also be added to compositions. Mention may be made by way of example of surface-active substances, fillers, flame retardants, nucleating agents, oxidation stabilizers, lubricants and mold release agents, dyes and pigments, optionally stabilizers, e.g. against hydrolysis, light, heat or discoloration, inorganic and/or organic fillers, reinforcing agents and plasticizers. As hydrolysis inhibitors, preference is given to using oligomeric and/or polymeric aliphatic or aromatic carbodiimides. In order to stabilize the TPU of the invention against aging, stabilizers are preferably added to the TPU. For the purposes of the present invention, stabilizers are additives which protect a plastic or a plastics mixture against harmful environmental influences. Examples are primary and secondary antioxidants, hindered amine light stabilizers, UV absorbers, hydrolysis inhibitors, quenchers and flame retardants. Examples of commercial stabilizers may be found in Plastics Additive Handbook, 5th Edition, H. Zweifel, ed., Hanser Publishers, Munich, 2001 ([), p. 98-p. 136.

In a preferred embodiment, the UV absorbers have a number average molecular weight of greater than $0.3 \times 10^3$ g/mol, in particular greater than $0.39 \times 10^3$ g/mol. Furthermore, the UV absorbers which are preferably used should have a molecular weight of not greater than $5 \times 10^3$ g/mol, particularly preferably not greater than $2 \times 10^3$ g/mol.

Particularly suitable UV absorbers are the group of benzotriazoles. Examples of particularly suitable benzotriazoles are Tinuvin® 213, Tinuvin® 234, Tinuvin® 571 and Tinuvin® 384 and Eversorb®82. The UV absorbers are usually added in amounts of from 0.01 to 5% by weight, based on the total mass of the TPU, preferably 0.1-2.0% by weight, in particular 0.2-0.5% by weight.

A UV stabilization as described above based on an antioxidant and a UV absorber is often still not sufficient to ensure good stability of the film against the damaging influence of UV rays. In this case, a hindered amine light stabilizer (HALS) can be added in addition to the antioxidant and the UV absorber to the film. HALSs are highly efficient UV stabilizers for most polymers.

HALS compounds are generally known and commercially available. Examples of commercially available HALSs may be found in Plastics Additive Handbook, 5th edition, H. Zweifel, Hanser Publishers, Munich, 2001, pp. 123-136.

As hindered amine light stabilizers, preference is given to employing hindered amine light stabilizers in which the number average molecular weight is greater than 500 g/mol. Furthermore, the molecular weight of the preferred HALS compounds should be not greater than 10 000 g/mol, particularly preferably not greater than 5000 g/mol.

Particularly preferred hindered amine light stabilizers are bis(1,2,2,6,6-pentamethylpiperidyl) sebacate (Tinuvin® 765, Ciba Spezialitatenchemie AG) and the condensation product of 1-hydroxyethyl-2,2,6,6-tetramethyl-4-hydroxypiperidine and succinic acid (Tinuvin® 622). Particular preference is given to the condensation product of 1-hydroxyethyl-2,2,6,6-tetramethyl-4-hydroxypiperidine and succinic acid (Tinuvin® 622) when the titanium content of the product is <150 ppm, preferably <50 ppm, in particular <10 ppm. HALS compounds are preferably used in a concentration of from 0.01 to 5% by weight, particularly preferably from 0.1 to 1% by weight, in particular from 0.15 to 0.3% by weight referring to the total weight of the film.

A particularly preferred UV stabilization system comprises a mixture of a phenolic stabilizer, a benzotriazole and a HALS compound in the above-described preferred amounts.

In a preferred embodiment of the film, hydrolysis inhibitors are comprised in the TPU composition as auxiliaries; preference is given here to oligomeric and/or polymeric aliphatic or aromatic carbodiimides.

Further details regarding the abovementioned auxiliaries and additives may be found in the specialist literature, for example in Plastics Additive Handbook, 5th edition, H. Zweifel, ed., Hanser Publishers, Munich, 2001.

Preparation of the TPU Composition

The preparation of the thermoplastic polyurethanes is carried out batchwise or continuously by known methods, preferably using reaction extruders or the belt process by the one-shot process or the prepolymer process, preferably by the one-shot process. In this process, the components isocyanates, polyols and optionally chain extenders and/or catalyst and/or additives and/or auxiliaries to be reacted can be mixed with one another in succession or simultaneously, with the reaction commencing immediately. In the extruder process, the formative components isocyanate, polyol and optionally chain extenders and/or additive and/or auxiliaries are introduced individually or as a mixture into the extruder, reacted at temperatures of preferably from 100° C. to 280° C., more preferably from 140° C. to 250° C., and the polyurethane obtained is extruded, cooled and pelletized.

A twin-screw extruder is preferred, as the twin-screw extruder operates with positive conveying and thus allows a more precise setting of the temperature and output quantity on the extruder.

Thermoplastic polyurethanes having a Shore A hardness of less than 95 are preferred, more preferably those having a hardness from 95 Shore A to 75 Shore A, more preferably from 95 Shore A to 80 Shore A, One preferred thermoplastic polyurethane composition comprises a thermoplastic polyurethane with a Shore A hardness of about 85 A. The polyols and chain extenders can advantageously be used in molar ratios of from 1:1 to 1:15, preferably from 1:2.5 to 1:10. These soft thermoplastic polyurethanes preferably are used fora stretch film. To prepare more rigid TPUs having a hardness of greater than 98 Shore A, preferably from 55 Shore D to 75 Shore D, the molar ratios of polyol to chain extenders are in the range from 1:10 to 1:20, preferably from 1:12 to 1:15

To prepare the thermoplastic polyurethane the formative components diisocyanate and polyol and optionally catalysts optionally in the presence of auxiliaries and/or additives are reacted in such amounts that the equivalence ratio of NCO groups of the diisocyanates (a) to the sum of the hydroxyl groups of the polyols and chain extenders is 0.95-1.10:1, preferably 0.98-1.08:1 and in particular about 1.0-1.05:1.

The TPU composition is produced by preparing thermoplastic polyurethane as described above in a step 1 and mixing this thermoplastic polyurethane with a salt or an ionic liquid, preferably an ionic liquid, in a step 2. Additives and/or auxiliaries in preferred embodiments are added in step 1, in step 2 and/or in a separate step 3. These steps may be performed together, or one after the other independent on the numbers given to the steps. Preferably step 2 is after step 1.

Preferably layer B is produced by preparing the thermoplastic polyurethane composition as described above. In preferred embodiment comprising in layer B a polymer 2 composition, the TPU composition is mixed with the polymer 2 composition in a step 4. The resulting product, also referred to as mixture, comprises the thermoplastic polyurethane composition as network in the polymer 2 composition.

Adhesive Layer

Preferably the film according to any of the precedent embodiments or their preferred embodiments with the at least two layers, layer A and layer B, each layer having an inner surface being in contact with the respective other layer, and an outer surface being opposite the inner surface, further comprising an adhesive on one of its outer surfaces, preferably the adhesive is on the outer surface of layer 1.

The adhesive used for the film may be any adhesive which fits to the polymer 1 composition, the thermoplastic polyurethane composition, or the polymer 2 composition. The adhesive is layer C, which may have the form of spots, any kind of net structure, regular or irregular, or is a film.

The adhesive is either a non-reactive adhesive or a reactive adhesive, the non-reactive adhesive is preferred.

Preferred examples of non-reactive adhesive are selected from the group consisting of polymer dispersion adhesives, preferably based on polyvinyl acetate (PVAc), pressure-sensitive adhesives (PSA) preferably based on acrylate-based polymers, contact adhesive, preferably based on natural rubber or polychloroprene, hot melt adhesive, preferably based on ethylene-vinyl acetate or polyethylene (PE), multi-component adhesive, preferably linking to acrylics, urethanes, or epoxies, and one-part adhesive.

Preferred combinations of multi-component adhesives are polyester—polyurethane resin, polyols—polyurethane resin, acrylic polymer—polyurethane resin. The multi-component resins can be either solvent-based or solvent-less.

One-part adhesive hardens via a chemical reaction with an external energy source, such as radiation, heat, and moisture. Ultraviolet (UV) light curing adhesives, also known as light curing materials (LCM) preferably are acrylic based. Heat curing adhesives consist of a pre-made mixture of two or more components. When heat is applied the components react and cross-link. This type of adhesive preferably includes thermoset epoxies, urethanes, and polyimides. Moisture curing adhesives cure when they react with moisture present on the substrate surface or in the air. This type of adhesive includes cyanoacrylates and urethanes.

Preferably the adhesive is a thermoplastic or a thermoset material, preferably thermoplastic, even more preferred polyethylene.

ULDPE:

In a preferred embodiment comprising all the features of any pf the precedent embodiments or one of their preferred embodiments the adhesive comprises ultra-low-density polyethylene (ULDPE). Preferably the adhesive is ultra-low-density polyethylene (ULDPE).

Preferably the ultra-low-density polyethylene (ULDPE) has a density between 0.85 g/cm$^3$ and 0.95 g/cm$^3$, measured according to DIN EN ISO 1183-1:2019, A, more preferably between 0.89 g/cm$^3$ and 0.91 g/cm$^3$, most preferably 0.90 g/cm$^3$.

Preferably the melt flow index (MFI, also referred to as melt flow rate MFR) of the ultra-low-density polyethylene (ULDPE) is between 1.0 g/10 min and 5.0 g/10 min at 190° C. and 2.16 kg load, measured according to DIN EN ISO 1133-1:2011, more preferably between 2.0 g/10 min and 4.0 g/10 min, even more preferably between 2.5 g/10 min and 3.5 g/10 min, most preferably 3.0 g/10 min.

Preferably the Vicat temperature of the ultra-low-density polyethylene (ULDPE) is between 85° C. and 95° C., measured according to DIN EN ISO 306:2013, A, more preferably between 87° C. and 93° C., more preferably between 88° C. and 92° C., more preferably between 89° C. and 91° C., most preferably 90° C.

The preferred embodiments of ULDPE these parameters of density, melt flow index, and Vicat temperature are either single preferred parameters, in other preferred embodiments two of these preferred parameters appear together or three of these preferred parameters appear together in preferred ULDPE.

In another preferred embodiment the film according to any of the precedent embodiments or one of their preferred embodiments has an electric resistance of less than $10^{12}$ Ohm measured according to DIN EN 62631-3-2:2018-09.

In another preferred embodiment the film according to any of the precedent embodiments or one of their preferred embodiments the layer B comprises a polymer 2 composition as outlined above comprising the thermoplastic polyurethane composition.

In another preferred embodiment the film according to any of the precedent embodiments or one of their preferred embodiments the polymer 2 composition comprises LDPE as the only polymer. In another preferred embodiment the polymer 2 composition is LDPE.

Use of the Thermoplastic Polyurethane Composition in a Film

Another aspect of this invention is the use of a thermoplastic polyurethane composition in a film, preferably a stretchable film, according to any of the precedent embodiments or its preferred embodiments, wherein in a first embodiment the film comprises at least two layers, layer A and layer B, each layer having an inner surface being in contact with the respective other layer, and an outer surface being opposite the inner surface, wherein layer A comprises a polymer 1 composition, preferably is a polymer 1 composition layer B comprises the thermoplastic polyurethane composition (TPU composition), and optionally a polymer 2 composition, preferably consists of either the TPU composition, or the TPU composition and the polymer 2 composition.

wherein the polyurethane of the TPU composition is prepared from
- an organic diisocyanate
- a polyol comprising a diol A and a diol B, wherein the diol A comprises ethoxy and propoxy groups and the diol B comprises butoxy groups.
- a chain extender and the TPU composition comprises a salt and/or an ionic liquid.

Production of the Film

Another aspect of the invention is a process for producing a film according to any of the precedent embodiments or their preferred embodiments comprising at least three steps
- step 1: producing the layer A, as specified above
- step 2: producing the layer B, as specified above
- step 3: combining at least layer A and layer B to form the film,
- eventually step 4 adding on at least one outer side of layer A or layer B the adhesive.

In one preferred embodiment step 1 and 2 may be carried out independently and step 3 and step 4 thereafter. In another preferred embodiment step 1, step 2 and step 3, further preferred also step 4, are carried out simultaneously. In a very preferred embodiment this process is carried out by multi-layer blow film extrusion.

Use of the Film

In a preferred embodiment the film according to any of the precedent embodiments or their preferred embodiments is used for wrapping materials or devices. In preferred embodiments these materials or devices are negatively affected by electrostatic charging or are used in surroundings where electrostatic charging has to be avoided.

The term "comprises as used above in preferred embodiments may be read on "is", which is a preferred embodiment of any embodiment using "coprising".

EXAMPLES (EEE)

Example 1

Materials Used

LLDPE: A linear low-density polyethylene of typical extrusion quality with a density (determined according to DIN EN ISO 1183-1:2019, A) of 0.92 g·cm$^{-3}$, an MFR (determined according to DIN EN ISO 1133-1:2011) at 190° C. and 2.16 kg of 1.0 g/(10 min), and a Vicat temperature (determined according to DIN EN ISO 306:2013, A) of 102° C.

ULDPE: A ultra-low-density polyethylene of typical extrusion quality with a density (determined according to DIN EN ISO 1183-1:2019, A) of 0.90 g·cm$^{-3}$, an MFR (determined according to DIN EN ISO 1133-1:2011) at 190° C. and 2.16 kg of 3.0 g/(10 min), and a Vicat temperature (determined according to DIN EN ISO 306:2103, A) of 90° C.

LDPE: A low-density polyethylene of typical extrusion quality with a density (determined according to DIN EN ISO 1183-1:2019, A) of 0.92 g·cm$^{-3}$, an MFR (determined according to DIN EN ISO 1133-1:2011) at 190° C. and 2.16 kg of 1.0 g/(10 min), and a Vicat temperature (determined according to DIN EN ISO 306:2013, A) of 96° C.

Additive: A thermoplastic polyurethane based on HDI, a polyol mixture of polytetramethylene glycol (PTMG) with molecular weight between 500 g/mol and 2000 g/mol and polyol with ethoxy and propoxy groups with molecular weight between 1500 g/mol and 3000 g/mol, and 1,6-hexandiol, comprising about 3 wt-% 1-ethyl-3-methylimidazolium ion (EMIM).

Example 2

Manufacturing of a Two-Layer Film with ULDPE and LLDPE (Comparative Example)

To manufacture a two-layer film the required polymers ULDPE (Layer C in Tab. 1) and LLDPE (Layer A in Tab. 1) were fed into separate single-screw extruders, and molten at temperatures between 180 and 210° C. The melts were separately dosed in two concentric nozzles through additionally air was blown, keeping the tubes in form an allow them to lay on each other to build the tubular film with ULDPE layer (Layer C) on the inner side of about 0.003 mm and LLDPE layer (Layer A) of about 0,017 mm on the outer side. This tubular film was cut along its axis to become the film, which after accommodation for 3 days was used in the following measurements.

Example 3

Three-Layer Film

To manufacture an anti-static three-layer film, in the first step 85 wt-% of LDPE and 15 wt-% of the Additive were compounded with a twin-screw extruder at a temperature between 180° C. and 200° C. resulting in a Blend that is further used.

In a second step ULDPE (Layer C in Tab. 1), LLDPE (Layer A in Tab. 1), and the Blend produced in the first step (Layer B in Tab. 1), were fed into separate melting devices, e.g. single-screw extruders, and molten at a temperature between 180° C. and 210° C. The melt for each of the three respective layers was separately dosed in concentric ring nozzles. Additionally air was blown through these concentric nozzles keeping the tubes in form and allow them to lay on each other to build the tubular film with ULDPE layer (layer C) on the inner side of about 0.003 mm, the LLDPE layer (layer A) of about 0.017 mm in the middle and the blend layer (Layer B) with about 0.003 mm on the outside of the tube, This tubular film was cut along its axis to become the film, which, after accommodation for 3 days, was used in the following measurements.

Example 4

Measurements

The surface resistivity of the anti-static stretch film according to Example 2 and 3 were measured according to DIN 62631-3-2:2018-09 in unstretched state (at 0% elongation) and stretched state (200% elongation).

TABLE 1

Overview on films and their respective surface resistivities.

| | No. | Film 1* | Film 2** | |
|---|---|---|---|---|
| Composition | Layer C | 100% ULDPE | 100% ULDPE | |
| | Layer A | 100% LLDPE | 100% LLDPE | |
| | Layer B | — | 100% Blend | |
| Stretched | | No | No | Yes |
| Surface resistance | 20% rel. hum. | $2.0*10^{15}$ | $1.7*10^{10}$ | $1.6*10^{10}$ |
| [Ω] | 50% rel. hum. | $2.0*10^{15}$ | $7.0*10^{9}$ | $6.2*10^{9}$ |
| (at 23° C.) | 70% rel. hum. | $1.9*10^{15}$ | $2.8*10^{9}$ | $2.7*10^{9}$ |

*Film prepared according to Example 2.
**Film prepared according to Example 3.

The invention claimed is:

1. A stretchable film, comprising:
at least two layers, comprising a layer A and a layer B, each layer having an inner surface being in contact with the respective other layer, and an outer surface being opposite the inner surface,
wherein
layer A comprises a polymer 1 composition, and
layer B comprises a thermoplastic polyurethane composition, and optionally a polymer 2 composition, wherein a polyurethane in the thermoplastic polyurethane composition is prepared from:
an organic diisocyanate,
a polyol comprising a diol A and a diol B, wherein the diol A comprises ethoxy and propoxy groups and the diol B comprises butoxy groups, and
a chain extender;
wherein the thermoplastic polyurethane composition comprises a salt, an ionic liquid, or a salt and an ionic liquid,
wherein the stretchable film has an elongation at break of more than 50% measured according to DIN ISO 53504, 2017-03, and
wherein the stretchable film comprises an adhesive on an outer surface of the stretchable film, wherein the adhesive comprises ultra-low-density polyethylene (ULDPE).

2. The stretchable film according to claim 1, wherein the stretchable film has an elongation at break of more than 100%, measured according to DIN ISO 53504, 2017-03.

3. The stretchable film according to claim 1, wherein a polymer of the polymer 1 composition is selected from the group consisting of polystyrene (PS), polyoxymethylene (POM), ethylene-vinyl acetate (EVA), acrylonitrile-butadiene-styrene (ABS), thermoplastic polyurethane (TPU), polyvinylchloride (PVC), polyethylene (PE), polypropylene (PP), and a mixture thereof.

4. The stretchable film according to claim 1, wherein a polymer of the polymer 1 composition is a low-density polyethylene (LDPE), a linear low-density polyethylene (LLDPE), or a mixture thereof.

5. The stretchable film according to claim 1, wherein the stretchable film has an electric resistance of less than $10^{12}$ Ohm measured according to DIN EN 62631-3-2:2018-09.

6. The stretchable film according to claim 1, wherein the layer B comprises the polymer 2 composition, which comprises the thermoplastic polyurethane composition.

7. The stretchable film according to claim 1, wherein a polymer of the polymer 2 composition is low-density polypropylene (LDPP).

8. The stretchable film according to claim 1, wherein the diol A is a block copolymer having a block and two ends, wherein the block comprises ethoxy and propoxy groups and the two ends of the block copolymer comprise exclusively ethoxy groups.

9. The stretchable film according to claim 1, wherein the ionic liquid comprises an imidazole ring.

10. A method, comprising:
preparing the stretchable film according to claim 1 with the thermoplastic polyurethane composition, wherein the polyurethane in the thermoplastic polyurethane composition is prepared from:
the organic diisocyanate,
the polyol comprising the diol A and the diol B, wherein the diol A comprises ethoxy and propoxy groups and the diol B comprises butoxy groups, and
the chain extender;
wherein the thermoplastic polyurethane composition comprises the salt, the ionic liquid, or the salt and the ionic liquid.

11. A process for producing the stretchable film according to claim 1, comprising at least:
producing the layer A,
producing the layer B,
combining at least layer A and layer B to form the stretchable film, and
adding on at least one outer side of layer A or layer B, a layer C comprising the adhesive.

12. The process according to claim 11, wherein layer C is added on the outer side of layer A.

13. The stretchable film according to claim 2, wherein the stretchable film has an elongation at break of more than 300%, measured according to DIN ISO 53504, 2017-03.

14. The stretchable film according to claim 4, wherein the polymer of the polymer 1 composition is a mixture of low-density polyethylene and linear low-density polyethylene.

15. The stretchable film according to claim 1, wherein the adhesive is on the outer surface of layer A.

* * * * *